(12) United States Patent
Zhao et al.

(10) Patent No.: US 10,423,685 B2
(45) Date of Patent: Sep. 24, 2019

(54) SYSTEM AND METHOD FOR AUTOMATIC QUESTION GENERATION FROM KNOWLEDGE BASE

(71) Applicant: Robert Bosch GmbH, Stuttgart (DE)

(72) Inventors: Lin Zhao, Sunnyvale, CA (US);
Linfeng Song, Rochester, NY (US);
Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 15/260,738

(22) Filed: Sep. 9, 2016

(65) Prior Publication Data
US 2018/0075145 A1 Mar. 15, 2018

(51) Int. Cl.
| G06F 17/00 | (2019.01) |
| G06F 16/9535 | (2019.01) |
| G06F 16/22 | (2019.01) |
| G06F 17/24 | (2006.01) |
| G06F 17/28 | (2006.01) |
| G06F 16/332 | (2019.01) |
| G06F 16/36 | (2019.01) |

(52) U.S. Cl.
CPC .......... *G06F 16/9535* (2019.01); *G06F 16/22* (2019.01); *G06F 16/3329* (2019.01); *G06F 16/367* (2019.01); *G06F 17/248* (2013.01); *G06F 17/2881* (2013.01)

(58) Field of Classification Search
CPC ............. G06F 17/2705; G06F 17/2765; G06F 17/278; G06F 17/2785; G06F 17/2881
See application file for complete search history.

(56) References Cited

U.S. PATENT DOCUMENTS

| 2011/0125734 A1 | 5/2011 | Duboue et al. |
| 2013/0196305 A1 | 8/2013 | Adir et al. |
| 2014/0379330 A1 | 12/2014 | Baughman et al. |
| 2015/0088998 A1* | 3/2015 | Isensee .................. H04L 51/02 709/206 |
| 2015/0179082 A1 | 6/2015 | Byron et al. |
| 2016/0117314 A1 | 4/2016 | Kantor et al. |

OTHER PUBLICATIONS

International Search Report corresponding to International Patent Application No. PCT/EP2017/072484 (4 pages).
Cubric, M. et al., "Towards automatic generation of e-assessment using semantic web technologies," International Journal of e-Assessment, 2011 (9 pages).
Jain, S. et al., "Automated Generation of Programming Language Quizzes," in Proceedings of 2015 10th Joint Meeting on Foundations of Software Engineering, ESEC/FSE, 2015 (3 pages).

* cited by examiner

*Primary Examiner* — Truong V Vo
(74) *Attorney, Agent, or Firm* — Maginot Moore & Beck LLP (57) ABSTRACT

A method of generating a question data set from a knowledge base including a plurality of statements includes generating at least one question template based on a structure of selected statements of the plurality of statements, generating a seed question for each selected statement based on the at least one question template with a processor, generating at least one first extension question with a search engine by processing each of the seed questions through the search engine, and storing at least one of the at least one first extension questions and the seed questions in a memory as the question data set.

18 Claims, 4 Drawing Sheets

FIG. 1

| | SUBJECT EXPRESSION | PREDICATE EXPRESSION | OBJECT EXPRESSION | # |
|---|---|---|---|---|
| 204 | JIGSAW | PERFORMS ACTIVITY | CURVE CUT | 1 |
| 204 | JIGSAW | PERFORMS ACTIVITY | STRAIGHT CUT | 2 |
| 204 | JIGSAW | PERFORMS ACTIVITY | BEVEL CUT | 3 |
| 204 | JIGSAW | INCLUDES ACCESSORY | METAL BLADE | 4 |
| 204 | JIGSAW | INCLUDES ACCESSORY | WOOD BLADE | 5 |
| 204 | JIGSAW | INCLUDES ACCESSORY | COMBINATION BLADE | 6 |
| 204 | POWER SCREWDRIVER | PERFORMS ACTIVITY | DRIVES SCREWS | 7 |
| 204 | POWER SCREWDRIVER | PERFORMS ACTIVITY | DRIVE DRILL BIT | 8 |
| 204 | POWER SCREWDRIVER | PERFORMS ACTIVITY | ILLUMINATE WORKPIECE | 9 |
| 204 | POWER SCREWDRIVER | INCLUDES ACCESSORY | FLAT HEAD BIT | 10 |
| 204 | POWER SCREWDRIVER | INCLUDES ACCESSORY | PHILLIPS HEAD BIT | 11 |
| 204 | POWER SCREWDRIVER | INCLUDES ACCESSORY | BATTERY PACK | 12 |

SYSTEM AND METHOD FOR AUTOMATIC QUESTION GENERATION FROM KNOWLEDGE BASE

FIELD

This disclosure relates to the field of information systems and in particular to natural language processing, question generation, and question answering from knowledge base data.

BACKGROUND

Question generation and answering are disciplines within computer science focused on building electronic data systems capable of providing natural language answers to natural language questions. For example, a data system may be configured to answer automatically the natural language question, "How many pints are in a gallon?" with a natural language answer of, "There are eight pints in one gallon." In the above example, both the question and the answer are presented in a format that a human speaker would use to ask and to answer the question, thereby making the answer easily understandable by the person asking the question.

In preparing a data system for natural language question answering a database of natural language questions and answers is generated. This process is referred to as data collection. Data collection typically involves machine learning methods and requires a certain amount of task-relevant data for training and testing purposes. A common data collection solution is to collect manually the data. For example, crowdsourcing is a typical way to collect manually data via online collaboration of many people. However, crowdsourcing is time consuming and sometimes it is hard to get data with good quality if the people who collect the data are not experts in the pertinent subject matter. Moreover, each time a data system directed to a different subject matter (i.e. a different domain) is desired, additional data is collected and the questions and answers must be generated again. Furthermore, the questions and answers of the data system are typically limited to a specific format, syntax, and organization.

Question and answering data systems have the potential to simplify human interaction with electronic machines. However, known methods and systems for building question and answering data systems are labor intensive and time consuming. For at least these reasons, further developments in the area of question and answering data systems are desired.

SUMMARY

According to an exemplary embodiment of the disclosure, a method of generating a question data set from a knowledge base including a plurality of statements includes generating at least one question template based on a structure of selected statements of the plurality of statements, generating a seed question for each selected statement based on the at least one question template with a processor, generating at least one first extension question with a search engine by processing each of the seed questions through the search engine, and storing at least one of the at least one first extension questions and the seed questions in a first memory as the question data set.

According to another exemplary embodiment of the disclosure, a question generation system for generating a question data set from a knowledge base having a plurality of statements includes a memory and a remote computer. The remote computer is operably connected to the knowledge base and to the memory. The remote computer includes a processor configured to identify at least one selected statement of the plurality of statements, to generate a seed question for each selected statement using at least one question template that is based on a structure of the at least one selected statement, to generate at least one first extension question from each of the seed questions with a search engine operably connected to the remote computer, and to store at least one of the at least one first extension questions and the seed questions in the memory as the question data set.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Alternate embodiments of the disclosure and their equivalents may be devised without parting from the spirit or scope of the disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

Figure 1:
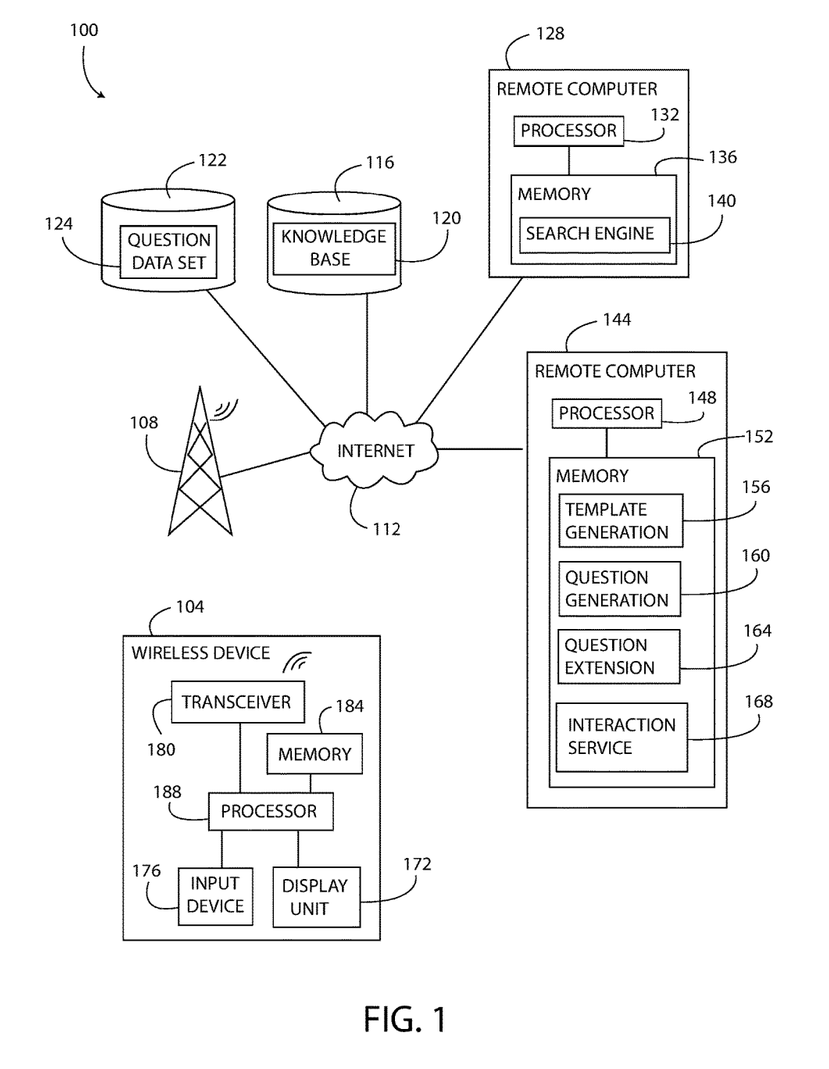
FIG. 1 is a block diagram of a question generation and answering system including a remote computer for generating a question data set and a client device configured to interface with the remote computer.

As shown in FIG. 1, a question generation and answering system 100 includes a wireless device 104 configured for communication with a cellular network 108 and the Internet 112, a first data server 116 configured to serve and to store a knowledge base 120, a second data server 122 configured to serve and to store a question data set 124, a first remote computer 128 including a processor 132 and a memory 136 storing program instruction for a search engine 140, a second remote computer 144 including a processor 148 and a memory 152 storing template generation software 156, question generation software 160, question extension software 164, and interaction service software 168. As set forth in detail below, the system 100 is configured to generate automatically natural language seed questions from data stored in the knowledge base 120 and to generate extension questions based on the seed questions using the search engine 140. The generated questions are stored in the question data set 124. The interaction service software 168 is configured to answer many types, versions, and constructs of natural language questions as received from a client device, such as the wireless device 104, using the question data set 124.

The wireless device 104 is an exemplary client device configured to send queries (i.e. question data) to the remote computer 144 and to receive data (i.e. answer data) from the remote computer 144 via the Internet 112. The device 104 includes a display unit 172, an input device 176, a transceiver 180, and a memory 184 each operably connected to a processor 188. The wireless device 104 is typically a cellular phone, a mobile phone, a smartphone, a tablet computer, or any other suitable device.

The display unit 172 is a liquid crystal display (LCD) panel configured to display text, images, and other visually comprehensible data. The display unit 172, in another embodiment, is any display as desired by those of ordinary skill in the art, including, but not limited to, an active-matrix organic light-emitting diode display.

The input device 176 is configured to enable a user to enter data and to manipulate objects shown on the display unit 172. For example, the input device 176 is configured to generate question data corresponding to a natural language question or other inquiry to be sent to the remote computer 144. In another embodiment, the input device 176 is a touchscreen applied over the display unit 172 that is configured to respond to the touch of a finger or a stylus. In yet another embodiment, the input device 176 is any device configured to generate an input signal, as desired by those of ordinary skill in the art.

The transceiver 180, which is also referred to as a wireless transmitter and receiver, is configured to communicate wirelessly with the cellular network 108, a wireless local area network ("Wi-Fi"), a personal area network, and/or any other wireless network. Accordingly, the transceiver 180 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The memory 184 is an electronic data storage unit, which is also referred to herein as a non-transient computer readable medium. As set forth herein, the memory 184 is configured to store program instructions and software for operating the wireless device 104. Any other electronic data may also be stored in the memory 184, such as data that is received from the data servers 116, 122 and the remote computers 128, 144 via the Internet 112.

The processor 188 is configured to execute program instructions and software stored in the memory 184 for operating the components connected thereto, such as the display unit 172, the input device 176, and the transceiver 180. The processor 188 is a provided as a microprocessor, a controller, or any other type of electronic control chip. In one embodiment, the processor 188 executes program instructions (i.e. software, an application, or an "app"), which are downloaded from the Internet 112, and that enable the wireless device 104 to communicate electronically with the remote computer 144. For example, program instructions and/or software for sending question data to the remote computer 144 and for receiving answer data from the remote computer 144 may be downloaded from the Internet 112, stored in the memory 184, and executed by the processor 188.

The first data server 116 is operably connected to the Internet 112 and is configured to receive data from the Internet 112 that is to be stored or added to the knowledge base 120. The data server 116 is also configured to receive question data directed to the knowledge base 120 from client devices and from the remote computer 144. Moreover, the data server 116 is further configured to send or to serve data to the client devices and the remote computers 128, 144 in response to the received data. For example, the data server 116 is configured to send data from the knowledge base 120 to the remote computer 144 in response to receiving a suitable request from the remote computer 144. The data server 116 may also be configured to send data from the knowledge base 120 to the remote computer 128 in response to receiving a suitable request from the remote computer 128 or the remote computer 144. The data server 116 is indirectly electrically connected to the remote computers 128, 144 through the Internet 112; however, in another embodiment, the data server 116 may be directly electrically connected to at least one of the remote computers 128, 144. Furthermore, in some embodiments the data server 116 may be included in one of the remote computers 128, 144.

Figure 2:
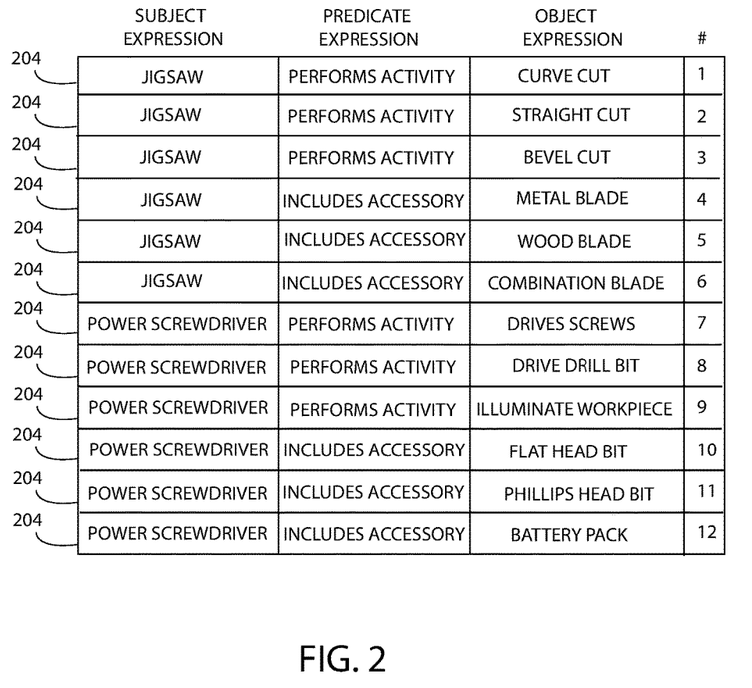
FIG. 2 is a depiction of statements from an exemplary knowledge base that is used by the remote computer to generate the question data set.

FIG. 2 depicts an exemplary portion of the knowledge base 120 stored in the data server 116. The knowledge base 120 includes electronic data in an organized format that is searchable by a computer system, such as the remote computers 128, 144 and the wireless device 104. In general, the electronic data included in the knowledge base 120 is either closed domain or open domain. A closed domain knowledge base is typically limited to a particular subject matter, such as power tools, for example. An open domain knowledge base is not typically limited to a particular subject matter. The use of both open domain and closed domain knowledge bases is growing rapidly. Moreover, in industry there already exists many structured electronic data sets suitable for organization into a knowledge base; thereby further increasing the number of available knowledge bases.

The exemplary knowledge base 120 of FIG. 2 is a closed domain resource description framework ("RDF") knowledge base. The domain is related to power tools. Each row of the knowledge base 120 is referred to herein as a statement 204 or a triple. The first column of the knowledge base 120 includes subject expressions of the statements 204, the second column of the knowledge base 120 includes predicate expressions of the statements 204, and the third column of the knowledge base 120 includes object expressions of the statements 204. The fourth column includes a number for conveniently referencing the statements 204 and may or may not be part of the knowledge base 120. The subject expressions denote a resource, such as a jigsaw or a power screwdriver, for example. The predicate expressions denote traits or aspects of the resources and express a relationship between the subject and the object. Thus, for example, the first statement 204 in the knowledge base 120 indicates that a "jigsaw" (subject) is configured to "perform the activity" (predicate) of a "curve cut" (object). The twelfth statement 204 in the knowledge base 120 indicates that a "power screwdriver" (subject) is configured to "include the accessory" (predicate) of a "battery pack" (object). In other embodiments of the knowledge base 120 and in other embodiments of the question generation and answering system 100, the knowledge base 120 may be any other type of knowledge base that is organized in any computer readable and searchable arrangement.

With reference again to FIG. 1, the second data server 122 is operably connected to the Internet 112 and is configured to serve and to store data associated with at least the question data set 124. In response to receiving a question, inquiry, or other request from the interaction service software 168, the data server 122 sends data from the question data set 124 to at least one of the wireless device 104 and the remote computers 128, 144. In FIG. 1, the data server 122 is operably connected to the remote computers 128, 144 through the Internet 112. In other embodiments, the data server 122 is directly connected to at least one of the remote computers 128, 144. As shown in FIG. 1, the knowledge base 120 and the question data set 124 are stored on different data servers 116, 122. In other embodiments, the knowledge base 120 and the question data set 124 are stored on the same data server or are included in one of the remote computers 128, 144.

The question data set 124 is a computer searchable data set including a plurality of questions and answers based on the knowledge base 120. In one embodiment, the questions and answers of the question data set 124 are natural language questions, meaning that the questions and answers are formatted in a manner that is understandable by a human reader. An exemplary question stored in the question data set 124 and based on the first statement 204 of the knowledge base 120 is, "Can a jigsaw be used to perform a curve cut in workpiece?" Another exemplary question stored in the question data set 124 and based on the same statement 204 is, "Is a jigsaw a suitable tool for performing a curve cut?" The question data set 124, in at least one embodiment, includes approximately ten thousand questions; however, in other embodiments the question data set 124 includes any suitable number of questions based on the number of statements in the knowledge base 120.

The remote computer 128 includes the processor 132 operably connected to the memory 136 that is configured to store program instructions for a search engine 140. The processor 132 is a provided as a microprocessor, a controller, or any other type of electronic control chip. The memory 136 is an electronic data storage unit, which is also referred to herein as a non-transient computer readable medium. Any other electronic data may also be stored in the memory 136. The remote computer 128 is configured to receive inquiries directed to the search engine 140 and to serve data generated by the search engine 140 to client devices operably connected to the Internet 112, such as the wireless device 104 and the remote computer 144, for example.

The search engine 140, which is also referred to herein as a web search engine, is a program, programs, or software configured to search for information or data on the Internet 112. The search engine 140 receives an inquiry or a search term(s) from a client device, processes the inquiry or search term through a database, for example, and then generates an output based on the inquiry or search term. For example, in response to receiving a search term such as, "power tools," the search engine 140 processes the search term and generates an output that includes a list of websites that include the search term. The search engine 140 is also configured to generate suggested search inquiries. For example, in response to receiving one of (i) a search term, (ii) a partial natural language inquiry, and/or (iii) a complete natural language inquiry, the search engine 140 is configured to generate additional complete natural language inquiries based on the received data. In response to receiving the following complete natural language inquiry, "Can a jigsaw cut nails?" the search engine 140 may generate and return the following additional natural language inquiries including (i) "Can a jigsaw cut through nails?," (ii) "Can you use a jigsaw to cut nails?", and (iii) "Can I use a jigsaw to cut a nail?" Thus, the search engine 140 is a source of natural language inquiries that is regularly updated. Exemplary search engines 140 include the search engines available at www.google.com and www.yahoo.com. In other embodiments, the search engine 140 may include any desired search engine or any combination search engines. That is, the search engine 140 may generate additional natural language inquiries by processing (i) a search term, (ii) a partial natural language inquiry, and/or (iii) a complete natural language inquiry through more than one search engine.

The remote computer 144 includes the processor 148 operably connected to the memory 152. The processor 148 is a provided as a microprocessor, a controller, or any other type of electronic control chip. The memory 152 is an electronic data storage unit, which is also referred to herein as a non-transient computer readable medium. The memory 152 is configured to store the template generation software 156, the question generation software 160, the question extension software 164, and the interaction service software 168, each of which is described below in detail. Any other electronic data, software, and/or program instructions may also be stored in the memory 152. The remote computer 144 is also referred to herein as an interaction service device, because the remote computer 144 includes the memory 152 having the interaction service software 168 stored thereon.

Figure 3:
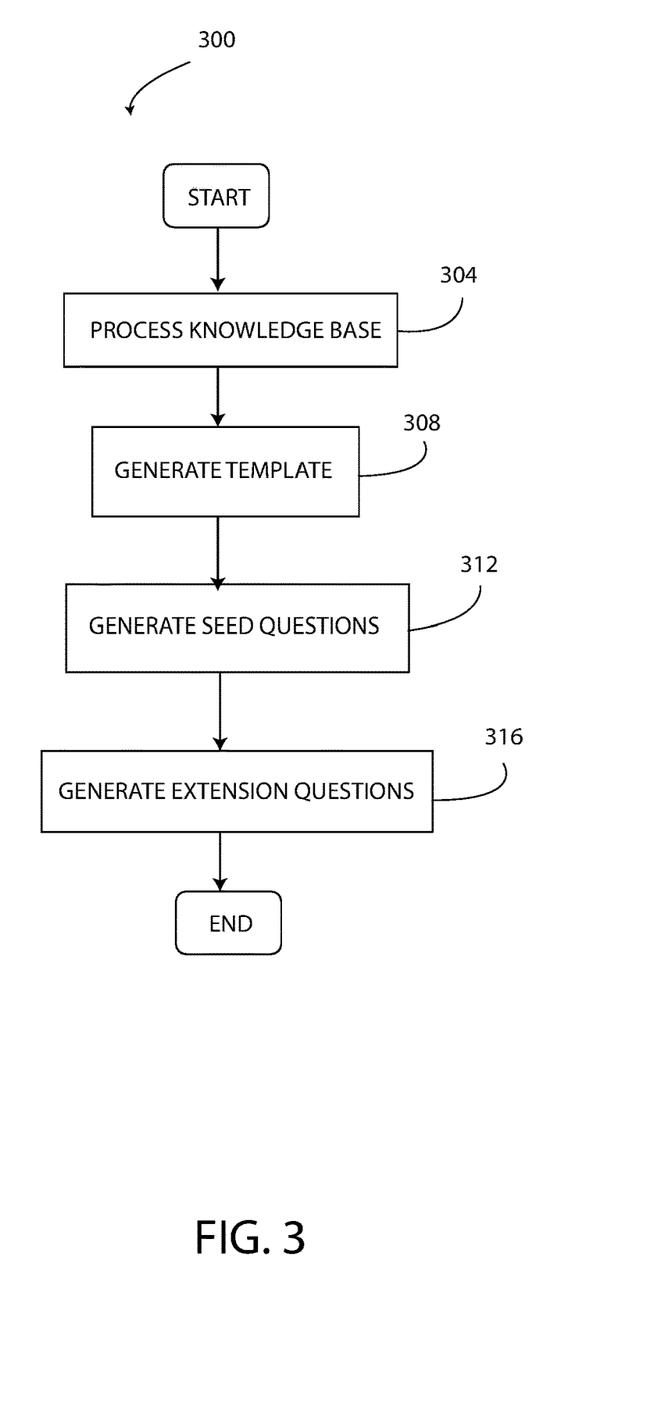
FIG. 3 is a flowchart depicting an exemplary method of generating the question data set.

In operation, the question generation and answering system 100 is configured to implement a method 300 illustrated by the flowchart of FIG. 3. In the description of the method 300, statements that the method 300 is performing some task or function refers to a controller or a general purpose processor executing programmed instructions stored in non-transitory computer readable storage media operatively connected to the controller or the processor to manipulate data or to operate one or more components in the question generation and answering system 100 to perform the task or function. Particularly, the processor circuitry/logic of the processor 148 of the remote computer 144 and/or the processor 132 of the remote computer 128 can be such a controller or processor. Alternatively, the processors 132, 148 can be implemented with more than one processor and associated circuitry and components, each of which is configured to form one or more tasks or functions described herein. Additionally, the method 300 may be performed in any feasible chronological order, regardless of the order shown in the figures or the order in which the method 300 is described.

Briefly, the method 300 includes processing the knowledge base 120 to identify selected statements 204, as shown by block 304. Then, the method 300 includes generating at least one question template for the selected statements 204 in block 308. Next, in block 312, the method 300 includes using the at least one question template to form a plurality of natural language seed questions from the selected statements 204. The seed questions are then processed by the search engine 140 to extend each seed question into at least one extension question, as noted in block 316. The seed questions and the extension questions are stored in the question data set 124, and at least the seed questions are associated with an answer. The remote computer 144 receives an inquiry from a client device (e.g. the wireless device 104) and causes the interaction service software 168 to use statistical processes to associate the received inquiry with the question of the question data set 124 that most closely matches (or exactly matches) the received inquiry. Next, the remote computer 144 sends the corresponding answer, if available, to the wireless device 104. In this way, the question generation and answering system 100 efficiently generates and answers natural language questions. Each of these steps is described in further detail below.

As shown in block 304, the method 300 includes processing the knowledge base 120 to identify selected statements 204. In some embodiments, some statements 204 or some parts of the knowledge base 120 may not be suitable for question generation; moreover, some statements 204 may be directed to a first domain and other statements 204 may be directed to a second domain. Accordingly, the method 300 includes using the processor 148 to identify the statements 204 of the knowledge base 120 from which meaningful questions can be generated; these statements 240 are referred to herein as selected statements 240. Accordingly, during the processing step of block 304, the processor 148 downloads at least a portion of the knowledge base 120 via the Internet 112, and processes the knowledge base 120 to identify selected statements 240 from which questions will be generated.

In one embodiment, during the processing step of block 304, the processor 148 determines a corresponding domain associated with each predicate expression of the statements 204. Then, a user selects one of the determined domains as the selected domain (also referred to herein as a "working domain"). After which, the processor 148 identifies the statements 204 having the selected domain as the selected statements 204 for further processing and question generation. The statements 204 having a domain that is not the same as or similar to the selected domain are not selected statements and are not used in the question generation.

During the processing step of block 304, the processor 148 may also organize the selected statements 204 in groups having the same or similar predicate expressions, thereby simplifying the template generation step of block 308. By organizing the predicate expressions, the processor 148 enables a user to remove any statements 204 that match or are similar to the selected domain, but that are not suitable for question generation. As shown in FIG. 2, there are two distinct predicate expressions; namely, "performs activity" and "includes accessory." Therefore, during the processing step of block 304 the processor 148 may group together statements 204 number 1-3 and 7-9 into a first group of statements 204, and the processor 148 may group together statements 204 number 4-6 and 10-12 into a second group of statements 204.

Next, in block 308 question templates are generated based on the structure of the selected statements 204. The question templates may be generated manually or may be generated automatically by the processor 148. Embodiments of the question generation and answering system 100 that generate the question templates automatically use the template generation software 156 stored in the memory 152. The question templates, whether generated manually or automatically, are stored in the memory 152. Additionally or alternatively, the question templates are stored in any desired electronic memory.

A question template is a "fill in the blank" guide that is used to turn a selected statement 204 into a natural language question. For example, a question template that may be generated for the statements 204 in the knowledge base 120 having the predicate expression "performs activity," is "Can an X perform Y?" In the preceding question template, the "X" is filled in with a subject expression and the "Y" is filled in with an object expression. Considering the first statement 204, filling in the question template results in a question reading, "Can a jigsaw perform curve cuts?" As another example, for the statements 204 in the knowledge base 120 having the predicate expression "includes accessory," the following question template may be used, "Does a X include a Y?" Considering the tenth statement 204, filling in the question template results in a question reading, "Does a power screwdriver include a flat head bit?" For the typical knowledge base 120 only two to three question templates are needed for each group of selected statements 204. Moreover, the question templates are easily and quickly generated by a user based on the structure of the statement 204; thus, it is not a significant burden to generate the question templates manually.

Next, in block 312, the processor 148 uses the question generation software 160 to generate at least one seed question for each selected statement 204. Accordingly, the remote computer 144 may be referred to herein as a question generation system. The seed questions are natural language questions that result from filling-in the question templates with the corresponding expressions from the statements 204 in the knowledge base 120. Thus, the exemplary questions set forth above including, "Can a jigsaw perform curve cuts?" and "Does a power screwdriver include a flat head bit?" are seed questions. Typically, at least one seed question is generated for each of the selected statements 204 of the knowledge base 120. However, if a particular statement 204 is associated with more than one question template, then more than one seed question may be generated from the particular selected statement 204. The seed questions are at least temporarily stored in the memory 152. The group of seed questions stored in the memory 152 may be referred to herein as a seed question set. Moreover, some or all of the seed questions may be stored in the question data set 124 of the data server 122.

An advantage of the seed question set is that since the seed questions are generated from the knowledge base 120 and the question templates, the key information in the seed questions (i.e. the subject expression, the predicate expression, and the object expression) are automatically annotated. That is, in the seed question, "Can a jigsaw perform curve cuts?," it is known from the knowledge base 120 that the subject expression is "jigsaw," the predicate expression is "performs activity," and the object expression is "curve cut." Therefore, human annotation of the seed questions is typically not needed.

Figure 4:
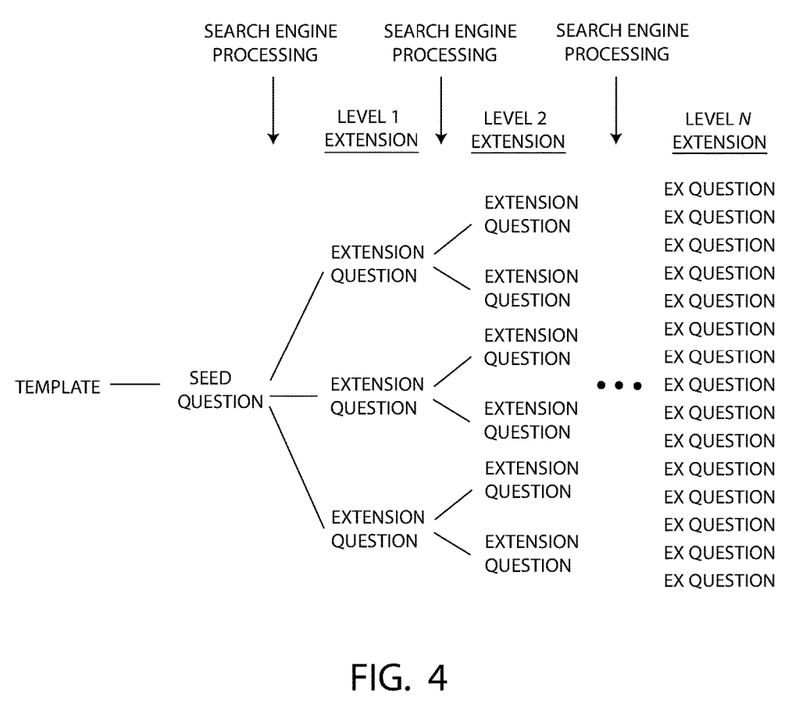
FIG. 4 is a diagram illustrating an exemplary question extension process using a search engine.

Next, in block 316 and with reference to FIG. 4, at least one extension question is generated with the search engine 140. Specifically, the extension questions are generated with the search engine 140 by processing one of the seed questions through the search engine 140 and then, if desired, processing the generated extension questions through the search engine 140 to generate additional extension questions. This process is repeated for each seed question. Typically, the seed questions are limited in terms of their scope and naturalness. To get more diversified questions, the system 100 leverages the Internet 112 to expand the seed question set. Specifically, each seed question is sent to the search engine 140 via the Internet 112. The search engine 140 is configured generate at least one extension question, that is different from the seed question, for each of the seed questions. The question extension process is illustrated by the diagram of FIG. 4. As shown in FIG. 4, after processing the seed question through the search engine 140, the search engine 140 generates three extension questions. The search engine 140 may generate from one to fifty extension questions during the processing of a question. Next, each of the extension questions is processed through the search engine 140 and two additional extension questions are generated for each of the original extension questions. This process is iteratively repeatable N times to generate any desired number of extension questions using the search engine 140.

The remote computer 128 sends the at least one extension question generated by the search engine 140 to the remote computer 144 via the Internet 112. The extension questions are stored in the memory 152 as an extension question set. For example, when the seed question "Does a power screwdriver include a flat head bit?" is sent to the search engine 140, the search engine 140 returns at least the following extension questions including, "Does a screwdriver have a flat head bit?," "Does a power screwdriver use a flat head bit?," and "Does a screwdriver include vodka?"

The extension questions typically represent real user's information needs, and, therefore, generation of the extension question typically results in many meaningful questions. However, the extension questions are not limited to the selected domain, and may contain noisy data that is either grammatically incorrect or irrelevant to the selected domain. For example, in the above example, the search engine 140 generates the extension question "Does a screwdriver include vodka?" The extension question is related to the beverage called a screwdriver instead of the power tool called a screwdriver. Thus, the extension question is not part of the selected domain. To account for this type of issue, the question extension software 164 processes the extension questions and removes any questions from the memory 152 that are related to a domain other than the selected domain, are grammatically incorrect, and/or contain offensive or inappropriate terms. The extension questions that are sufficiently related to the selected domain are referred to herein as the selected extension questions. The extension questions may also be manually filtered by a human technician to remove undesired extension questions and to identify the selected extension questions.

In one embodiment, filtering the extension questions based on domain is referred to as selecting extension questions based on the relevance and fluency of the extension questions. Relevance is a measure of whether the extension question is related to the selected domain. Fluency is a measure of whether the extension question is well-written in a natural sentence construction. Only those extension questions having high relevance and fluency are included in the question data set 124. Depending on the embodiment, different factors may be used to determine the extension questions that are closely enough related to the selected domain to be included in the question data set 124. In an embodiment in which the extension questions are automatically filtered, the question extension software 164 applies statistical approaches, for example, to the extension questions to filter the extension questions.

After the processor 148 generates the seed questions and has determined the selected extension questions, the processor 148 associates at least the seed questions with an answer. Typically, the knowledge base 120 includes answers to the questions that are generated from the statements 204. For example, the answer is "Yes," to the exemplary seed question "Does a power screwdriver include a flat head bit?" It can be determined that the answer is "Yes," based on the structure of the tenth statement 204, which indicates that a power screwdriver does include a flat head bit. Accordingly, the knowledge base 120 may not have a column for the "answers;" however, the answers can be determined by the processor 148 for at least the seed questions, or by a human technician for the seed questions and the extension questions. That is, if the answers to any of the questions cannot be automatically generated by the processor 148, a human technician can determine the answer to any of the questions. The answers to the seed questions are at least temporary stored in the memory 152.

Next, the remote computer 144 stores the seed questions, the selected extension questions, and the answers in the question data set 124 of the data server 122. The question data set 124, therefore, includes a plurality of questions related to the selected domain. The questions are useful in many applications, such as intelligent user interaction and assistance systems, which provide users intelligent services based on their natural language questions or queries. The questions of the question data set 124 typically reflect real information needs of a user. By utilizing the question data set 124, the intelligent user interaction and assistance system can learn what kind of information the user will try to get and how the user is likely to formulate their request in natural language questions for the selected domain. In one embodiment, the question data set 124 is used to train a question understanding module, which is part of a question answering service.

In an exemplary embodiment, the interaction service software 168 of the remote computer 144 utilities the question data set 124 to answer questions received from a client device, such as the wireless device 104. Thus, the remote computer 144 is an exemplary intelligent user interaction and assistance system. Specifically, a user inputs a natural language question (or a question in any other format) into the wireless device 104 using the input device 176. The wireless device 104 sends question data corresponding to the user input question to the remote computer 144, which processes the question data through the interaction service software 168. In particular, the interaction service software 168 uses the question data set 124 and statistical analysis approaches and/or any other desired processing steps to determine a match question that is the closest question of the question data set 124 to the user input question. Then the remote computer 144 sends the answer associated with the match question to the wireless device 104 via the Internet 112. In this way, the user input question is answered quickly, easily, and in a natural language format.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of generating a question data set from a knowledge base including a plurality of statements, the method comprising:

generating at least one question template based on a structure of selected statements of the plurality of statements;

generating a seed question for each selected statement based on the at least one question template with a processor;

generating at least one first extension question with a search engine by processing each of the seed questions through the search engine; and storing at least one of the at least one first extension questions and the seed questions in a first memory as the question data set.

2. The method of claim 1, further comprising:

generating at least one second extension question with the search engine by processing at least one of the at least one first extension questions through the search engine; and adding at least one of the at least one second extension questions to question data set.

3. The method of claim 1, further comprising:

associating each seed question with a corresponding answer from the knowledge base using the processor.

4. The method of claim 3, further comprising:

receiving question data from a client device operably connected to the processor;

determining a match question as one of the seed questions to which the question data is most similar; and sending the answer associated with the match question to the client device.

5. The method of claim 1, wherein the knowledge base is a resource description framework knowledge base and each statement of the plurality of statements includes a subject expression, a predicate expression, and an object expression.

6. The method of claim 5, wherein generating the seed question for each selected statement comprises:

filling-in the at least one question template with at least the subject expression and the object expression of a corresponding statement of the plurality of statements with the processor.

7. The method of claim 1, further comprising:

determining a corresponding domain associated with each statement of the plurality of statements;

determining a selected domain; and selecting the selected statements as the statements of the plurality of statements that have the selected domain.

8. The method of claim 7, further comprising:

determining a corresponding domain of each of the at least one first extension questions; and adding only the at least one extension questions having the selected domain to the question data set.

9. The method of claim 1, wherein the at least one question template is generated manually and saved to a second memory operably connected to the processor.

10. A question generation system for generating a question data set from a knowledge base having a plurality of statements, comprising:

a memory; and a remote computer operably connected to the knowledge base and to the memory, the remote computer including a processor configured to identify at least one selected statement of the plurality of statements, generate a seed question for each selected statement using at least one question template that is based on a structure of the at least one selected statement, generate at least one first extension question from each of the seed questions with a search engine operably connected to the remote computer, and store at least one of the at least one first extension questions and the seed questions in the memory as the question data set.

11. The question generation system of claim 10, wherein the processor is further configured to:

generate at least one second extension question from each of the first extension questions with the search engine; and store at least one of the at least one second extension questions in the memory as the question data set.

12. The question generation system of claim 10, wherein the processor is further configured to:

associate each seed question with a corresponding answer from the knowledge base.

13. The question generation system of claim 12, further comprising:

an interaction service device operably configured to (i) receive question data from a client device, (ii) determine a match question as one of the seed questions to which the question data is most similar, and (iii) send the answer associated with the match question to the client device.

14. The question generation system of claim 10, wherein the knowledge base is a resource description framework knowledge base and each statement of the plurality of statements includes a subject expression, a predicate expression, and an object expression.

15. The question generation system of claim 14, wherein the processor generates the seed question for each selected statement by filling-in the at least one question template with at least the subject expression and the object expression of a corresponding statement of the plurality of statements.

16. The question generation system of claim 10, wherein the processor is further configured to:

determine a corresponding domain associated with each statement of the plurality of statements;

determine a selected domain; and identify the at least one selected statement as the statements of the plurality of statements that have the selected domain.

17. The question generation system of claim 16, wherein the processor is further configured to:

determine a domain of each of the at least one first extension questions; and store only the at least one extension questions having the selected domain in the memory as the question data set.

18. The question generation system of claim 10, wherein the at least one question template is generated manually.

* * * * *